United States Patent
Raghupathy

(10) Patent No.: US 7,258,238 B2
(45) Date of Patent: Aug. 21, 2007

(54) DEBRIS FILTER WITH A ROTATING DEBRIS EXTRACTOR

(75) Inventor: Balakrishnan Govindasamy Raghupathy, Tamil Nadu (IN)

(73) Assignee: GEA Energy System (India) Limited, Tamil Nadu (IN)

( * ) Notice: Subject to any disclaimer, the term of this patent is extended or adjusted under 35 U.S.C. 154(b) by 0 days.

(21) Appl. No.: 10/501,232

(22) PCT Filed: Jul. 11, 2002

(86) PCT No.: PCT/IN02/00149

§ 371 (c)(1),
(2), (4) Date: Jul. 12, 2004

(87) PCT Pub. No.: WO2004/007051

PCT Pub. Date: Jan. 22, 2004

(65) Prior Publication Data

US 2005/0082209 A1    Apr. 21, 2005

(51) Int. Cl.
*B01D 29/68* (2006.01)
(52) U.S. Cl. .................... 210/411; 210/415
(58) Field of Classification Search ............... 210/411, 210/108, 415
See application file for complete search history.

(56) References Cited

U.S. PATENT DOCUMENTS

| | | | |
|---|---|---|---|
| 2,066,479 A | * | 1/1937 | Macisaac ............ 210/777 |
| 2,131,002 A | * | 9/1938 | Streander ............ 210/411 |
| 4,204,961 A | | 5/1980 | Cusato |
| 4,352,739 A | | 10/1982 | Oliver |
| 4,582,603 A | * | 4/1986 | Nasse ............ 210/323.2 |
| 4,867,879 A | * | 9/1989 | Muller ............ 210/392 |
| 4,904,397 A | * | 2/1990 | Eimer et al. ............ 210/791 |
| 5,108,592 A | | 4/1992 | Wilkins et al. |
| 5,587,074 A | * | 12/1996 | Lynch et al. ............ 210/411 |
| 5,728,297 A | * | 3/1998 | Koller ............ 210/407 |

FOREIGN PATENT DOCUMENTS

| | | | |
|---|---|---|---|
| DE | 3829360 | * | 3/1990 |
| JP | 44-006495 | * | 3/1969 |

OTHER PUBLICATIONS

International Search Report dated Nov. 13, 2002.

* cited by examiner

*Primary Examiner*—Thomas M. Lithgow
(74) *Attorney, Agent, or Firm*—Rader, Fishman & Grauer PLLC

(57) ABSTRACT

A filter for filtering solid particles from liquids, especially for use in steam condensers and heat exchanger in thermal and nuclear power plants, said filter comprising a housing (4), a screen basket (2) located within said housing (4), a debris discharge pipe (1) for discharging accumulated and captured debris; a debris extractor arm (3) with a curvature towards the screen extending outwards at a predetermined radius with respective vertical plane, the said debris extractor arm (3) being rotatably driven over the entire length of the screen to create a low pressure between the debris extractor arm (3) and the screen (4) for complete extraction of debris and conveying to said debris discharge pipe (1).

4 Claims, 4 Drawing Sheets

DEBRIS FILTER WITH A ROTATING DEBRIS EXTRACTOR

FIELD OF INVENTION

This invention relates to a debris filter with rotating debris extractor. In particular, this invention is concerned with a debris extractor. Further, this invention provides a system and a method, of removal of debris from filter screen.

BACKGROUND OF THE INVENTION

It is well known in the art that thermal and nuclear power plants use steam condensers for condensation of steam after the energy has been utilized to drive the turbine. The steam condensers known in the art may be either water-cooled or air-cooled. In water-cooled process, water is typically obtained from sources like sea, rivers and lakes. The quantity of water required is quite large and it contains debris like grass, shells, fish, cloth and plastic sheet. These debris tend to clog the tubes of the steam condensers causing reduction in heat transfer which in turn may affect power generation. The problem of accumulation of debris and need for periodic removal of debris posses a serious challenge to the power generating plants. To over come this problem an automatic debris filter is installed at the inlet of the condenser, which filters and removes out such suspended particles. The automatic debris filters of the conventional type uses different techniques for removing debris and there is scope for further improvement in this area. In one such conventional debris filter a tubular housing and a screen basket is provided, the said screen basket is fastened to the inner periphery of housing. In the general arrangement of debris filter, a debris extraction arm is mounted on the inlet side of the basket and is rotatable with respect to the screen and on its complete surface area. The disadvantages faced by using this filter is that the sealing lips near the location where the suction arm closes a segment of the screen to create back wash, wears off and thereby back wash effect reduces time to time. Further the debris coming between the seal and suction arm obstructs the smooth rotation of the suction arm. Also, since one segment of the screen is completely closed by the suction arm, the screen area available for filtration gets reduced.

For dislodging and removing debris clogged on the screen suction arms, which completely closes a segment of the screen and is rotatable to cover the complete screen, another method was adopted in the prior art is to use a debris filter with a rotatable suction arm inside the basket arm along with a jet water spray arrangement positioned outside the screen. In this debris filter the profile of the debris extractor does not facilitate removal of sticky debris from the screen easily. Hence, an additional water spray pump which delivers water at a velocity more than the inlet velocity of water from the clean side of filter is required to reverse the sticky debris from the screen. This arrangement results in additional power consumption for the water spray pump and also makes it more expensive.

The object of the invention is to provide a novel debris filter with a rotating debris extractor, which overcome the abovementioned disadvantages in the conventional debris extractors.

DISCLOSURE OF THE INVENTION

The invention provides a filter for filtering solid particles from liquids, especially for use in steam condensers and heat exchanger in thermal and nuclear power plants, said filter comprising a housing, a screen basket located within said housing, a debris discharge pipe for discharging accumulated and captured debris; a debris extractor arm with a curvature towards the screen extending outwards at a predetermined radius with respective vertical plane, the said debris extractor arm being rotatably driven over the entire length of the screen to create a low pressure between the debris extractor arm and the screen for complete extraction of debris and conveying to said debris discharge pipe.

BRIEF DESCRIPTION OF THE INVENTION

The debris filter for removing solid particles from liquid according to the invention comprises a tubular housing, a screen basket fastened to the inner periphery of said housing, a debris discharge pipe to discharge the accumulated and captured debris and a debris extractor having a unique arm designed for maximum efficiency. The said debris extractor arm is rotated at a low speed so as to enable the complete filtering of the liquid.

The profile of the debris extractor arm provides a suction effect right through the arm. That is to say the suction is created on the entire length of arm. The debris extractor arm has a specially designed profile with a curvature towards the screen extending outwards at a predetermined radius with respect to vertical plane. This profile causes a lower pressure between the screen and the extractor compared to pressure elsewhere in the screen. This feature ensures that the debris on the screen is lifted from the screen and channeled through the extractor to the outlet. The modified design of debris extractor of the present invention overcome the constraints of the debris filter known in the prior art, resulting in higher efficiency and better performance of the debris filter.

Another object of the invention is to provide a debris filter which has unique extraction means which results in effective debris removal.

Yet another object of the invention is to provide a debris filter with debris extractor which does not disturb the smooth rotation of debris extraction arm.

A further object of the invention is to provide a sturdy debris filter with a debris extractor which is efficient, economical and avoid the need for a water jet spray arrangement to clean the inside of the basket.

DESCRIPTION OF THE DRAWINGS

Further features and other objects and advantages of this invention will become clear from the following detailed descriptions made with reference to the accompanying drawings, in which.

DETAIL DESCRIPTION

Figure 1:
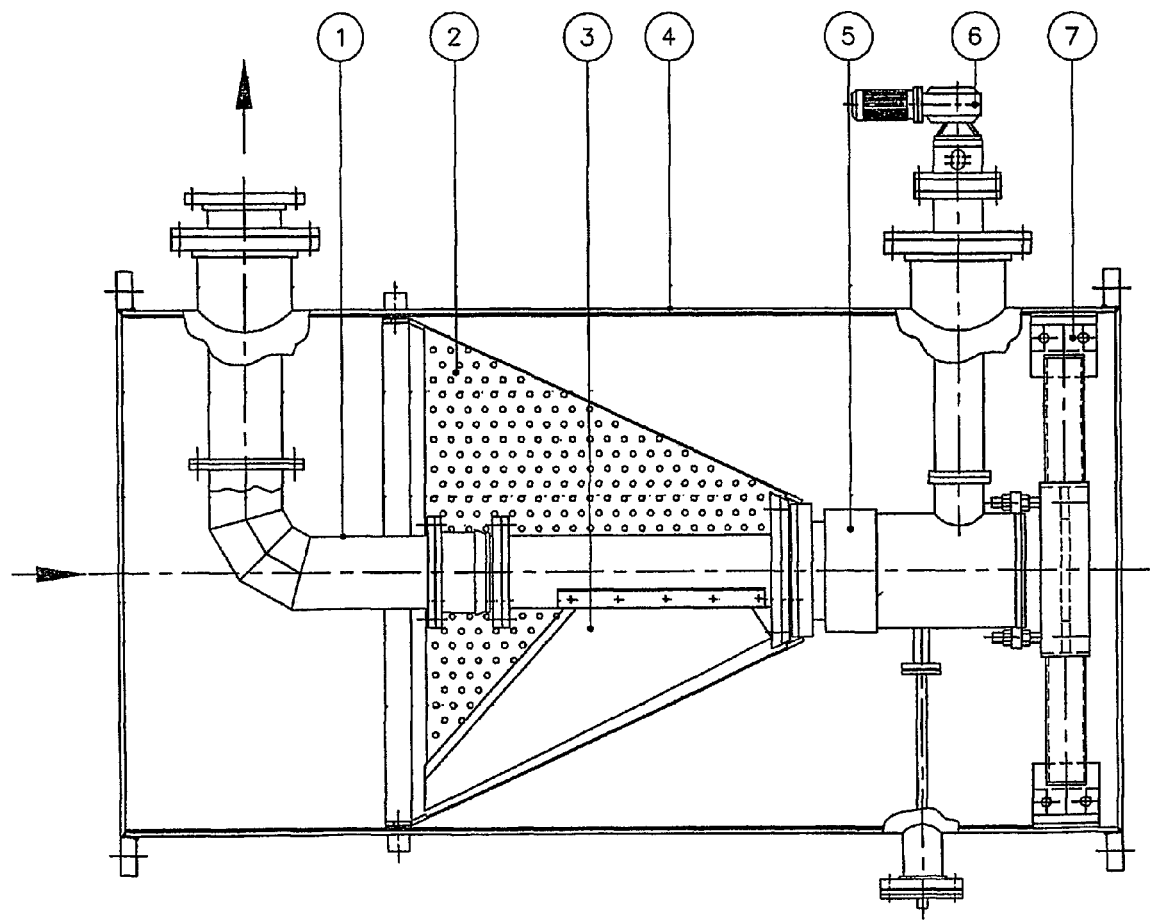
FIG. 1: shows a longitudinal cross-section of the debris filter with a rotating debris extractor according to the present invention.
Figure 2:
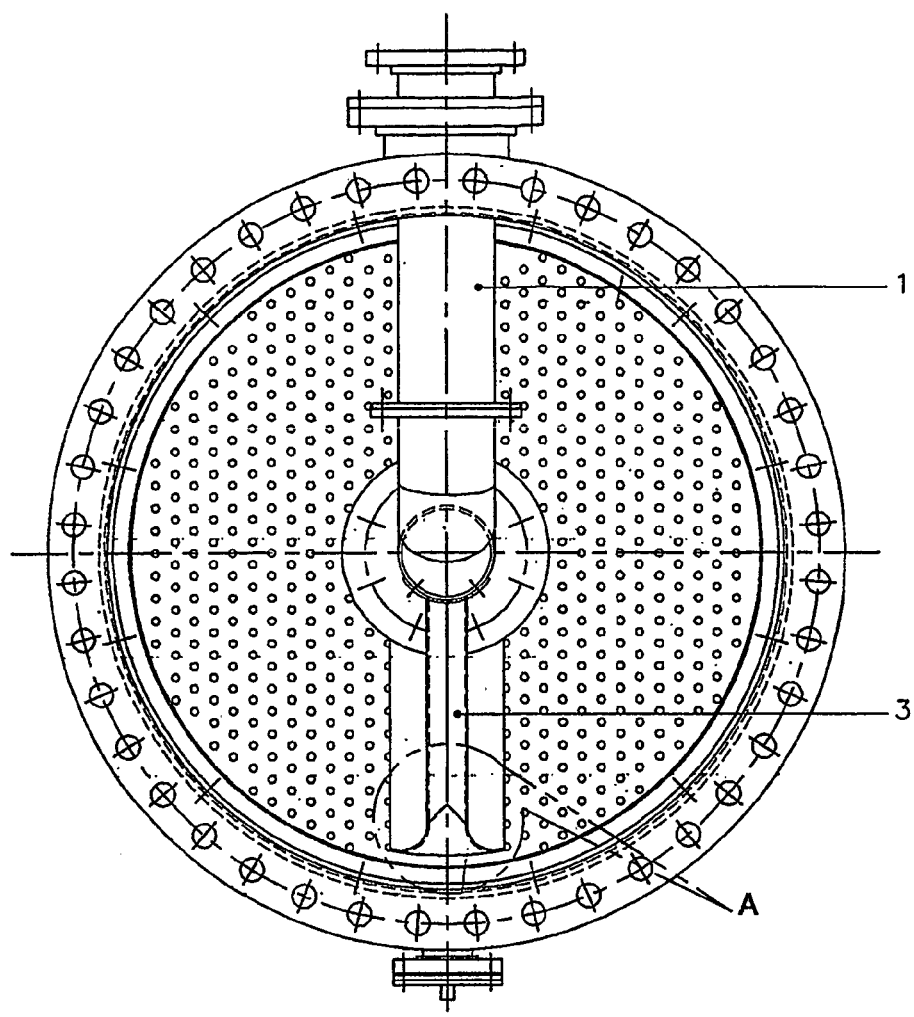
FIG. 2: shows a cross-sectional view of the debris filter according to the invention.
Figure 3:
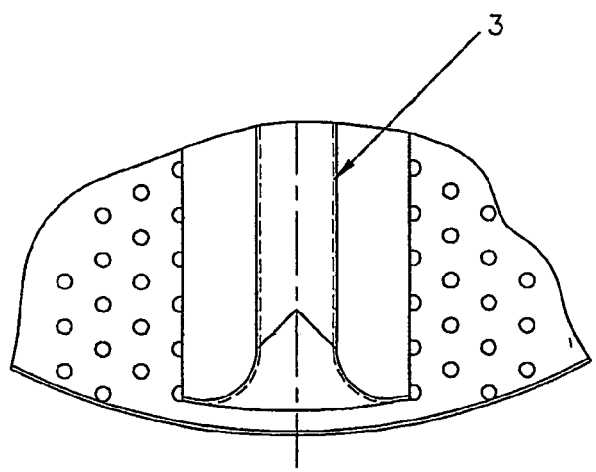
FIG. 3: shows the detailed view of the portion indicated by A in FIG. 2.
Figure 4:
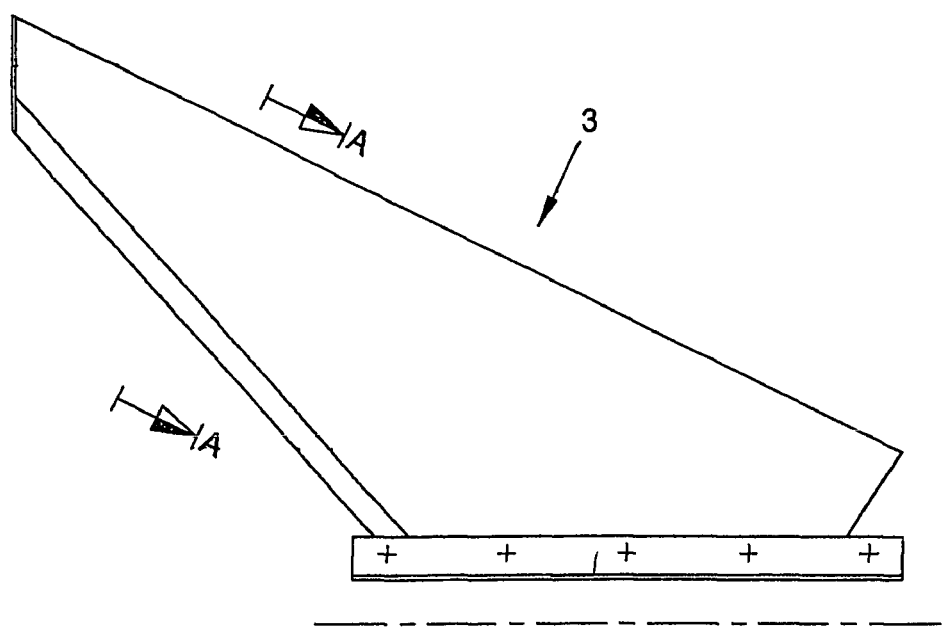
FIG. 4: shows the debris arm extractor.

The debris filter according to the invention comprises a screen basket (2) which captures the debris, a debris discharge pipe (1), to discharge the accumulated and captured debris, a debris extractor arm (3) for removing debris from the screen basket (2), all housed in a tubular housing (4). Then the debris extractor arm (3) is rotated at low speed preferably using geared motor drive (6). A special gear train may be incorporated in the gear box housing (5) to enable high torque at minimum speed. The gear box housing (5) and gear box sealing support (7) are housed in a housing (4) and the debris extractor arm (3) is rotated by a motor drive (6).

The debris extractor arm (3) does not come in contact with screen but at the same time produces an effective extraction of debris from the screen basket (2). In addition, it eliminates the problems in the debris separators known in the art and avoids use of a prevalent special water spray pump. This is achieved by a unique profile of the debris extractor arm with a curvature towards the screen extending outwards at a predetermined radius with respective vertical plane which creates a low pressure between the debris extractor arm and screen compared to pressure elsewhere inside the tubular housing (4). This low pressure results in effective extraction of debris, which is then conveyed to debris discharge line. This distance between the screen basket (2) and debris extractor arm (3) can be varied to suit the size of debris achieving more effective debris removal and ensures that the encountered debris does not disturb the rotation of the debris extractor arm (3).

The debris filter automatically removes all types of coarse matter from the liquid. The debris filter is normally installed as close as possible upstream of the heat transfer equipment. Essentially, filtration is achieved by a conical screen basket. The cooling water conditions dictate the size and type of perforation. Preferably, the perforation size may be in the range of 0.5 mm to 10 mm.

A debris extractor arm is located on the inside of the screen basket to collect the dislodged debris. This debris extractor arm rotates over the whole length of the conical screen and is driven by a low speed motor. The debris collected through the debris extractor arm is moved through a debris discharge pipe to the cooling water outlet along with a small percentage of cooling water. The flushing of the debris from the debris filter is carried out automatically either after a preset time or when the pressure drop exceed the preset value. Flushing cycle normally does not exceed 3 minutes and it is adjusted to suit the site condition. The debris filter operates at inlet flow velocities up to 4 meters per second and offers a low head loss. The debris filter according to the invention may be made to suit customer requirements particularly adapting to the space available at site and the pressure loss criteria.

Figure 5:
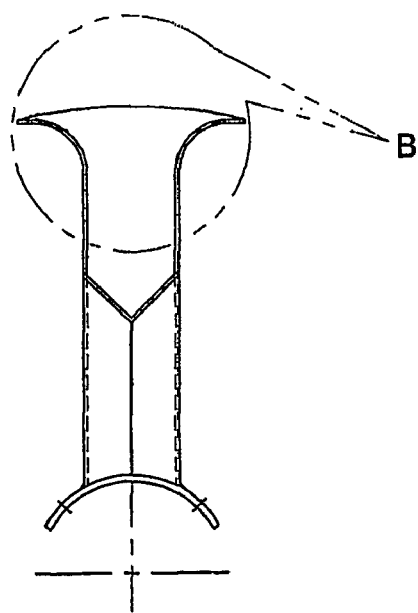
FIG. 5: shows a sectional view along A-A of the debris arm extractor shown in FIG. 4.
Figure 6:
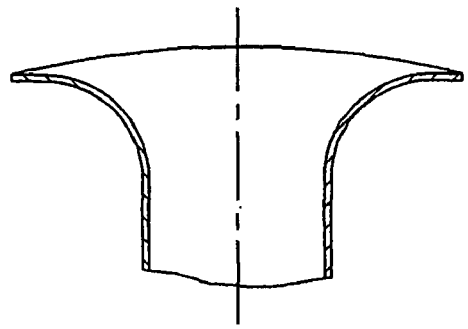
FIG. 6: shows a detail view of B indicated in FIG. 5.
Figure 7:
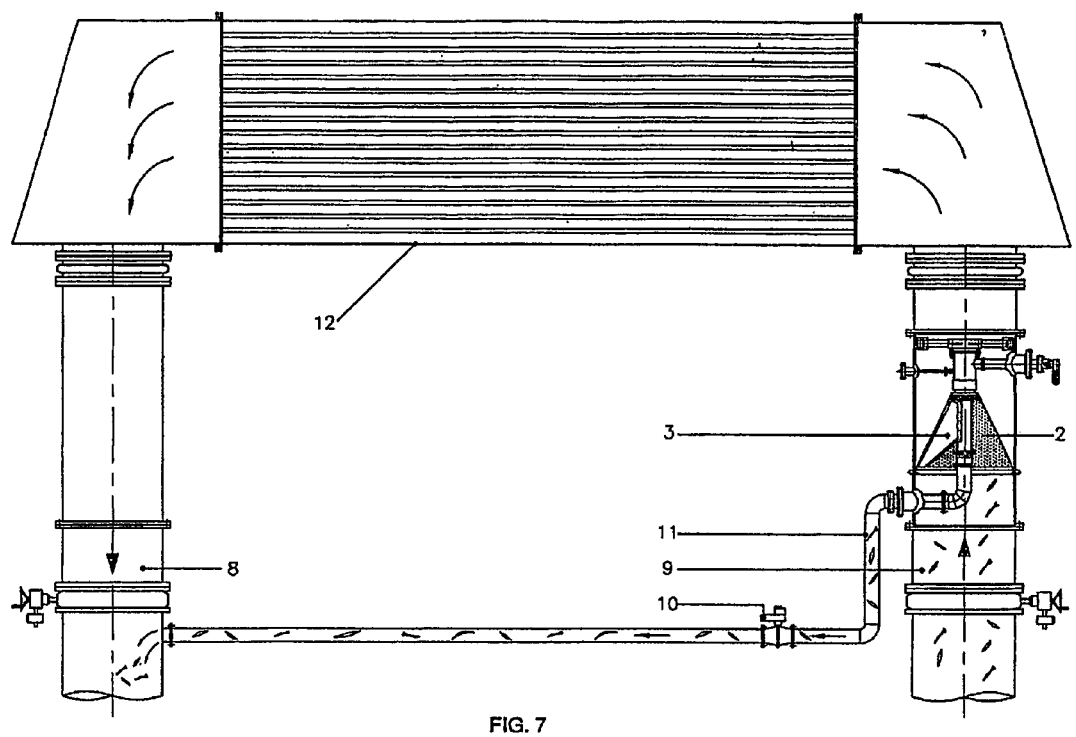
FIG. 7: shows a cooling system incorporating the debris filter according to the present invention.

The invention has various applications. A specific application of the device is as an energy saving system. The object of energy saving system has unique implication in the improvement of heat transfer in condensers and heat exchangers used in power plants and process plants. The placement of debris filter in the energy saving system is illustrated in FIG. 5 of the drawings. The plant comprises an outlet (8) and inlet (9) for cold water, a debris outlet valve (10), a debris output pipe (11) and a condenser (12). Such a plant facilitate removal of debris completely which results in augmenting efficiency of the plant.

It is to be noted that the object of the description is to explain the salient features of the invention. It is to be further noted that within the scope and ambit of the invention various amendments or modification are possible. An embodiment of the invention for which the scope of the invention is defined in the following statement of claims.

The invention claimed is:

1. A filter for filtering solid particles from a flowing liquid, especially for use in steam condensers and heat exchangers in thermal and nuclear power plants, said filter comprising a cylindrical housing (4) extending longitudinally along and about a central axis, a conically-shaped screen basket (2) located within said housing (4), a debris discharge pipe (1) extending longitudinally along and about the central axis within said housing (4) and operative for discharging accumulated and captured debris; a debris extractor arm (3) connected to and extending from the debris discharge pipe (1) and located at a predetermined distance above the screen so as to maintain an open gap between the bottom surface of the debris extractor arm and the screen basket (2), wherein said debris extractor arm (3) is rotatably driven over the entire length of the screen basket, wherein the liquid flows in a first longitudinal direction within the housing (4) such that unfiltered liquid flows towards the screen basket (2) in the first longitudinal direction and, after being filtered, filtered liquid flows away from the screen basket (2) in the first longitudinal direction while debris-laden liquid flows in a second longitudinal direction being opposite the first longitudinal direction, wherein the conically-shaped screen basket (2) tapers in the first longitudinal direction and wherein the debris extractor arm (3) includes a pair of pentagon-shaped panel members, a first side connecting member, a second side connecting member, an intermediate side connecting member and an elongated trumpet-shaped inlet nozzle, the pair of pentagon-shaped panel members being disposed apart from one another in a facially-opposing mirrored relationship, each pentagon-shaped panel member having a long edge, a first intermediate edge, a second intermediate edge, a first short edge and a second short edge with the long edge being longer than the first intermediate edge, the second intermediate edge, the first short edge and the second short edge and the first and second intermediate edges being longer than the first short edge and the second short edge and with the long edge being contiguous to and between the first and second short edges, the first intermediate edge being contiguous to and between the first short edge and the second intermediate edge and the second intermediate edge being contiguous to and between the first intermediate edge and the second short edge, the first side connecting member connected to and between respective ones of the first short edges, the second side connecting member connected to and between respective ones of the second short edges and the intermediate side connecting member connected to and between respective ones of the second intermediate edges thereby defining a debris extraction channel with opposing ones of the long edges and the first and second side connecting members defining a debris inlet into the debris extraction channel and with opposing ones of the first intermediate edges, the first side connecting member and the intermediate side connecting member defining a debris outlet from the debris extraction channel for fluid communication with the debris discharge pipe, the elongated trumpet-shaped inlet nozzle connected to the respective ones of the long edges, the first side connecting member and the second connecting member, the elongated trumpet-shaped inlet nozzle having a curvature towards the screen and extending outwards at a predetermined radius with a respective vertical plane to create a low pressure between the debris extractor arm (3) and the screen basket (2) for complete extraction of debris and conveying to said debris discharge pipe (1).

2. The filter as claimed in claim 1, wherein the debris extractor arm (3) is provided with a drive for driving over the entire length of the screen.

3. The filter as claimed in claim 2, wherein the drive is a geared motor drive (5, 6).

4. A cooling system comprising an inlet (9) and an outlet (8) for cooling water, a debris filter, a debris outlet valve (10), a debris output pipe (11) and a condenser (12) for heat transfer, wherein the debris filter includes a cylindrical housing (4) extending longitudinally along and about a central axis, a conically-shaped screen basket (2) located within said housing (4), a debris discharge pipe (1) extending longitudinally along and about the central axis within said housing (4) and operative for discharging accumulated and captured debris; a debris extractor arm (3) connected to and extending from the debris discharge pipe (1) and located at a predetermined distance above the screen so as to maintain an open gap between the bottom surface of the debris extractor arm and the screen basket (2), wherein said debris extractor arm (3) is rotatably driven over the entire length of the screen basket (2), wherein the liquid flows in a first longitudinal direction within the housing (4) such that unfiltered liquid flows towards the screen basket (2) in the first longitudinal direction and, after being filtered, filtered liquid flows away from the screen basket (2) in the first longitudinal direction while debris-laden liquid flows in a second longitudinal direction being opposite the first longitudinal direction, wherein the conically-shaped screen basket (2) tapers in the first longitudinal direction and wherein the debris extractor arm (3) includes a pair of pentagon-shaped panel members, a first side connecting member, a second side connecting member, an intermediate side connecting member and an elongated trumpet-shaped inlet nozzle, the pair of pentagon-shaped panel members being disposed apart from one another in a facially-opposing mirrored relationship, each pentagon-shaped panel member having a long edge, a first intermediate edge, a second intermediate edge, a first short edge and a second short edge with the long edge being longer than the first intermediate edge, the second intermediate edge, the first short edge and the second short edge and the first and second intermediate edges being longer than the first short edge and the second short edge and with the lone edge being contiguous to and between the first and second short edges, the first intermediate edge being contiguous to and between the first short edge and the second intermediate edge and the second intermediate edge being contiguous to and between the first intermediate edge and the second short edge, the first side connecting member connected to and between respective ones of the first short edges, the second side connecting member connected to and between respective ones of the second short edges and the intermediate side connecting member connected to and between respective ones of the second intermediate edges thereby defining a debris extraction channel with opposing ones of the long edges and the first and second side connecting members defining a debris inlet into the debris extraction channel and with opposing ones of the first intermediate edges, the first side connecting member and the intermediate side connecting member defining a debris outlet from the debris extraction channel for fluid communication with the debris discharge pipe, the elongated trumpet-shaped inlet nozzle connected to the respective ones of the long edges, the first side connecting member and the second connecting member, the elongated trumpet-shaped inlet nozzle having a curvature towards the screen and extending outwards at a predetermined radius with a respective vertical plane to create a low pressure between the debris extractor arm (3) and the screen basket (2) for complete extraction of debris and conveying to said debris discharge pipe (1).

* * * * *